US008627898B2

(12) United States Patent
Nance

(10) Patent No.: US 8,627,898 B2
(45) Date of Patent: Jan. 14, 2014

(54) TILLAGE SYSTEM

(76) Inventor: John D. Nance, Ringoes, NJ (US)

( * ) Notice: Subject to any disclaimer, the term of this patent is extended or adjusted under 35 U.S.C. 154(b) by 26 days.

(21) Appl. No.: 12/658,486

(22) Filed: Feb. 8, 2010

(65) Prior Publication Data

US 2011/0192618 A1    Aug. 11, 2011

(51) Int. Cl.
*A01B 5/00* (2006.01)

(52) U.S. Cl.
USPC ............ 172/146; 172/151; 172/186; 172/579

(58) Field of Classification Search
USPC ......... 172/138, 145, 146, 151, 184, 186, 133, 172/148, 154, 176, 68, 585, 583, 579, 540, 172/187, 177, 165, 166, 139, 141
See application file for complete search history.

(56) References Cited

U.S. PATENT DOCUMENTS

| 369,163 | A | | 8/1887 | Clark | 172/555 |
|---|---|---|---|---|---|
| 1,762,844 | A | * | 6/1930 | Beissel | 172/596 |
| 1,931,960 | A | * | 10/1933 | Johnson | 172/186 |
| 1,954,783 | A | | 4/1934 | Bohmker | 172/599 |
| 2,455,147 | A | * | 11/1948 | Traver | 280/469 |
| 2,613,581 | A | * | 10/1952 | Pretzer | 172/140 |
| 3,718,103 | A | | 2/1973 | Orthman | 172/159 |
| 3,870,108 | A | | 3/1975 | Orthman | 172/722 |
| 3,941,193 | A | | 3/1976 | Shoemaker | 172/106 |
| 4,102,406 | A | | 7/1978 | Orthman | 172/540 |
| 4,231,305 | A | * | 11/1980 | van der Lely | 111/119 |
| 4,538,688 | A | | 9/1985 | Szucs et al. | 172/555 |
| 4,834,189 | A | | 5/1989 | Peterson et al. | 172/166 |
| 5,020,604 | A | * | 6/1991 | Peck | 172/177 |
| 5,207,279 | A | * | 5/1993 | Nelson et al. | 172/140 |
| 5,623,997 | A | | 4/1997 | Rawson et al. | 172/156 |
| 5,649,602 | A | | 7/1997 | Bruce | 172/604 |
| 5,797,460 | A | * | 8/1998 | Parker et al. | 172/151 |
| 6,276,462 | B1 | * | 8/2001 | Dietrich, Sr. | 172/138 |
| 6,422,323 | B1 | * | 7/2002 | Dietrich, Sr. | 172/724 |
| 6,554,078 | B1 | * | 4/2003 | McDonald | 172/69 |
| 6,557,646 | B1 | * | 5/2003 | Hurtis et al. | 172/156 |
| 7,017,675 | B2 | * | 3/2006 | Ankenman et al. | 172/146 |
| 7,575,066 | B2 | | 8/2009 | Bauer | 172/540 |
| 2004/0016554 | A1 | * | 1/2004 | McDonald | 172/146 |

OTHER PUBLICATIONS

Soilwarrior at http://www.soilwarrior.com/soil.php.

* cited by examiner

*Primary Examiner* — Jamie L McGowan
(74) *Attorney, Agent, or Firm* — Ernest D. Buff; Ernest D. Buff & Assoc. LLC; Dave Narasimhan

(57) ABSTRACT

A tillage system has a first set of deep tilling tines and a second set of shallow tilling coulter tines present in a number more than twice that of the deep tilling tines. The deep tilling tines till the field to a depth of about 5 to 12 inches at row planting locations, loosening the soil for easy plant growth. This deep grooving action builds mounds of soil at both sides of the deep groove which are cleared by a second set of shallow tilling curved coulter tines followed by a third set of plurality of rows of shallow tilling toothed coulters that till the space between grooves to a depth of about 1 to 4 inches, providing a water reservoir space and clearing plant debris. A last row of shallow tilling ruffled coulters are provided to mix and incorporate into soil plant debris and plant stocks, anchoring tilled soil.

13 Claims, 6 Drawing Sheets

TILLAGE SYSTEM

BACKGROUND OF THE INVENTION

1. Field of the Invention

The present invention relates to a tillage system used by farmers to till a field in spring prior to planting and in fall after harvesting farm crops; and, more particularly to a tillage system used to produce deep tilled rows and shallow tilled regions therebetween, leaving behind a smooth clean-tilled field that conserves water and soil fertility without excessive soil erosion.

2. Description of the Prior Art

Many patents address issues related to tilling a farm field. Several of the tillage systems are designed to deep-till a field. Such deep-tilling causes top soil loss due to soil erosion. In addition, deep-tilling degrades field fertility more and more each year. Run-off of soil and fertilizer tends to pollute rivers and waterways. Some of the patents restrict deep tilling to spaced rows. These tillage systems practice minimal tillage principles and leave behind compacted soil between deep tilled rows with stocks of weed protruding from the soil resulting in unsightly field after the tillage operation. Besides, the compacted soil between the deep tilled rows encourages water run offs and soil erosion at the deep tilled rows.

U.S. Pat. No. 3,941,193 to Shoemaker discloses a ground tilling apparatus. The tilling apparatus characterized by a regulating drive connection between the towing tractor drive axle and the tiller shaft, the tiller tines having a modified arcuate configuration which provide a pocketed, rather than a furrowed or channeled, tilling depth profile. The tiller shaft drives the tiller in the same direction with the tiller circumferential speed substantially equal to the ground speed of the tractor, whereby said tips generate a curtate cycloidal curve as the tines rotate and the tips pierce the ground by curtate cycloidal movement with the shank portions following in the holes formed by the tips. This tilling apparatus has two sets of tilling tines oriented and turned in opposite directions. The first tine rotational speed is matched to the ground speed so as to remove large clumps of soil and the second set of tines bust the clumps. The device does not till deep along planting rows.

U.S. Pat. No. 4,102,406 to Orthman discloses a ground conditioning device and method of conditioning soil. This device creates water-holding and retaining cavities that are formed in furrows with the cavities being staggered between adjacent rows. An arm spring biased downwardly carries a hub having spikes in planes laterally spaced apart with the spikes around the hub being staggered between the planes. Each spike is concave longitudinally and in transverse cross section and is secured to opposite sides of a disc mounting plate by a pair of clamping elements one of which is integrally connected to the mounting plate. The hiller row unit is used after the row crop is established in a bed prepared by the splitter or shaper equipment that is disclosed in U.S. Pat. Nos. 3,718,103 and 3,870,108. The hiller provides for ridging with an absolute minimum of root pruning with only the soil that is used to build the ridge being disturbed. The device does not deep-till a plurality of parallel rows where seed planting is planned.

U.S. Pat. No. 4,834,189 to Peterson et al. discloses a row crop cultivator. The row crop cultivator is adapted for use in minimum tillage applications. A plurality of ganged cultivating units is mounted on a tool bar adapted to be towed behind a tractor vehicle. Each cultivating unit comprises a frame, which is supported on a pair of spaced-apart gauge wheels. Also mounted on the frame for rotation within the gap between the gauge wheels is a disk-shaped coulter blade, which is configured to cut through crop residue and weed debris as the material being cut is held against the ground surface by the gauge wheels. This arrangement tends to prevent improper cutting known as "hair-pinning". Trailing directly behind the coulter blade is a middleworker comprising a narrow width shank depending from the frame. The shank has a weld point on its lower leading edge and wing-like share blades flaring rearwardly and outwardly at a predetermined angle from the lower end of the shank. The middleworker design reduces the tendency for slabs of earth to be thrown onto and thereby damaging growing row crops. The row crop cultivator shields the row of plants that are growing in rows with a pair of coulters and the portion between the rows is weeded or disturbed by a horizontal tiller. The row crop cultivator does not deep-till the field at row planting locations.

U.S. Pat. No. 5,623,997 to Rawson et al. discloses a soil zone-builder coulter closer/tiller. The soil manipulation device is provided for closing a groove in soil formed by a soil tiller shank. The device includes a frame connected to a rear portion of the tiller shank and a pair of rotatable coulter blades mounted on the frame for engaging soil behind the tiller shank. The coulter blades are positioned on opposite sides of the groove so as to close the groove in the soil behind the tiller shank. The coulter blades are selectively movable and positionable in directions toward and away from each other so as to vary the distance between the coulter blades. The coulter blades also are selectively movable and positionable in a substantially vertical direction with respect to the frame, so as to permit variation in depth of coulter blade penetration into the soil. The coulter blades have side surfaces, which are selectively movable and positionable from orientations which are substantially in parallel with the groove to orientations which are out of parallel with the groove, so as to variably manipulate soil on opposite sides of the groove. The tiller meant for inserting seeds is followed by two coulters that close the soil groove formed by the tiller. The coulters may be independently positioned to adjust the groove closing process. The device of the '997 patent does not till a field; but rather plants seeds in a previously tilled field and closes the grove formed after setting plant seeds in the groove.

U.S. Pat. No. 7,575,066 to Bauer discloses a zone tillage tool and method. This patented device is marketed as "Soilwarrior", and detailed by the web page at http://www.soilwarrior.com/soil.php. This zone tillage tool comprises a tool frame connected by a parallel lift linkage to a tool bar. A fall tillage coulter or dual spring tillage coulters can be carried on the tool frame in advance of a pair of containment coulters. The fall tillage coulter tills soil in a zone that is approximately 7 to 9 inches deep while the spring tillage coulters till 2 to 3 inches deep. The tillage tool has a tool bar that mounts a plurality of tools with its own tool frames carrying independently controllable tillage coulter followed by a pair of slanted containment coulters in the direction of movement of the tillage tool. The tillage tool with its plurality of tillage coulter and containment coulters only creates deep tilled grooves in the field at the places where planting will be done. Spaces between these deep grooves are not tilled, and the soil remains undisturbed with all the weeds still in place, creating an unsightly appearance, Moreover, when rain water or irrigation water is applied to the field, all the water runs into the deep grooves, which have only limited volume and ability to absorb water. This causes selective erosion of soil from the deep grooves. The rainwater or irrigation water runs freely on the compacted soil between the deep tilled rows; run-off water rich in fertilizers and top soil pollutes lakes and rivers.

A number of prior art patents disclose coulters of different geometry and harrowing tools. For example, U.S. Pat. No. 369,163 to Clark discloses a disk harrow; U.S. Pat. No. 1,954, 783 to Bohmker discloses a disk blade; U.S. Pat. No. 4,538, 688 to Szucs et al, discloses fluted coulter blade and U.S. Pat. No. 5,649,602 to Bruce discloses wavy coulter.

There remains a need in the art for a tillage system that deep-tills at the planting rows so that planted seeds grow easily and vigorously. The entire field should not be deep-tilled, since deep-tilling everywhere results in water run-offs that produce soil erosion and fertilizer loss with consequent pollution of rivers and water ways. There is need in the art for a tilling system that clears plant debris, including stocks, sufficiently to leave behind a field with a clean-tilled appearance and minimal soil disturbance between the deep-tilled rows and which provides sufficient water absorption and storage to prevent water run-offs and consequent soil erosion.

SUMMARY OF THE INVENTION

The present invention provides a tillage system, which can be used by farmers to till a field in spring prior to planting and in fall after harvesting farm crops for primary tillage. The system of this invention includes a plurality of spaced first deep tilling tines that plough the field deep along planting rows. A plurality of spaced rows of shallow tilling tines positioned in front of and mostly behind the deep tilling tines in the moving direction of the tiller smoothen the ground adjacent to the deep tilled location and clear the debris on the land segments between the deep tilled planting rows. This creates a field that appears tilled, rather than a field which, despite having been deep tilled, retains unsightly plant stocks and weed residue between the deep tilled locations. The last row of shallow tilling coulter is always provided that has a ruffled disk pushes debris such as plant stocks into the ground, thereby mixing and anchoring tilled soil between the deep-tilled groves and preventing water run-off and consequent soil erosion. A third set of tools has a series of harrows, cage rollers or packer wheels may be used behind the shallow tilling ruffled disks to smoothen the soil surface.

The tillage system has a tool bar that carries a plurality of deep tilling tines with inserted hardened steel projections adapted to till the ground along a plurality of planting rows. Due to the large diameter of these deep-tilling tines, the depth of till may be adjusted from about 5 inches to 12 inches for fall tilling and from 5 to 8 inches for spring tilling. Such an adjustment is easily made by changing the location of an individual attachment bar loaded by spring, air pressure or a hydraulic ram, which connects the deep tilling cutters to the tool bar. This first set of deep-tilling tines may be driven at a tilling ground speed selected by the operator. When a deep tilling tine comes across a hard object such as rock, the loading mechanism yields, thereby preventing damage to the deep tilling tines. The deep tilling tines unearth weeds and bring to the top of the soil any plant roots present there within. As a result of this deep tilling, deep grooves are formed in the field. These grooves are bound by two mounds of soil, one mound being located to either side of the deep groove. The deep tilling tines may be made with a number of structural configurations including toothed tines with lateral and radial extensions, three dimensionally formed ruffled coulters and other geometric shapes all designed to deep till to a depth of 5 to 12 inches. If deeper depth is required for different soil types, the diameter of the deep tillage tine will be increased. Unless disturbed, the land segments between the deep grooves would remain essentially untilled and exhibit an unsightly appearance. A conventional tilling system does not have these shallow tilling tines or coulters such as that disclosed in U.S. Pat. No. 7,575,066 to Bauer strictly produces the tilling of deep grooves at the plant rows. Irrigation of the field occasioned by rain or artificial irrigation causes water to collect within the deep grooves. The deep grooves have limited volume, which limits their ability to absorb water into the field. Moreover, the mounds formed to either side of the grooves typically contain high quality topsoil, which tends to be washed off, carrying fertilizer that was previously applied, and producing soil erosion. The ability of water to be absorbed in the untilled portion of the field between the deep tilled grooves is very limited and most of the water supplied by rain or artificial irrigation runs off from the field due to soil compaction without benefiting the planted crop.

The present invention uses plurality of sets of shallow, nominally vertical coulters that are placed directly behind as well as in front of the deep tilling tines at adjustable, selected distances. The shallow tilling coulters may be dispersed in several rows, some in front of the deep tilling tines and some always behind the deep tilling tines and may have several shapes. The coulters may be in the form of toothed tine rotors or rotors with a ruffled structure. These shallow tilling coulters have no specific spacing relation to the spacing of the deep tilling tines, and are generally present in a much greater number than the number of deep tilling tines employed. When a shallow tilling coulter is placed in front of the deep tilling tines, it functions to size the crop residue and clear the ground facilitating smooth operation of the deep tilling tines. All the shallow tilling tines are run at the ground speed of the tillage system. The depth of till for the shallow till coulters is adjusted by moving the coulter wheels up or down. This adjustment is effected by the operator of the tillage system, and is nominally in the 1 to 4 inches range. The shallow tilling coulters thus clear most of the plant debris in the field between the deep tilled grooves. They also stir and mix the soil. Preferably, the shallow tilled portions of the field tilled by the coulters only disturb the soil slightly providing space for the water absorption from rain or artificial irrigation. Water run-off is substantially prevented. The field provided by the tilling practice of the present invention exhibits a neat appearance characterized by the removal of perennial weeds previously extant between the deep tilled grooves. The tool bar may be increased in width by adding a set of hydraulic folding wings that carry the similar arrangement of tines.

For example, a typical tillage system has a first row of deep tilling tines, the second row of curved coulters designed to displace the tilled soil laterally perpendicular to the movement direction. These curved coulters may be lifted off above the ground when not needed. A third row of shallow tilling toothed coulters is provided the orientation of which is set from zero to 10 degrees with respect to the travel direction of the tillage system. The inclined toothed shallow tilling coulters displace soil laterally eliminating mounds and mixing plant debris with the soil in a manner similar to curved coulters and may function better in some soils or crop fields. A last fourth row of ruffled disks shallow tilling coulters is always provided to mix the plant debris into the tilled ground, binding the soil from water erosion. A fifth row of soil surface smoothening tools such as harrow tools, cage roller tool or packer wheels may be provided. A shallow tilling toothed coulter may be additionally added in front of deep tilling tines to size tall plant debris in the field enabling tilling deep tilled grooves in the field more easily. The number of shallow tilling coulter and its order may be changed according to the needs of field being tilled.

Advantageously, the tillage system of the present invention leaves behind a clean tilled field with very little or no unsightly weeds and a plurality of deep tilled grooves for row planting of a crop. The deep tilled grooves do not have mounds on either side thereof due to the tilling action of the shallow tilling coulters. In addition, the field surface is well leveled and free from water running channels, a key feature that prevents water run off.

Significant advantages are realized by practice of the present invention. The key elements of the tillage system of the present invention comprise, in combination, the features set forth below:

1) a tool bar carrying a plurality of tool frames with adjustable spacing and the ability to lower or raise the tool frame individually;

2) one of the tool frame having rotatable deep tines that is rotated at the tillage system ground speed selected by the operator;

3) the deep tilling tines being inserted into the field for a depth of approximately 5 to 12 inches for fall tilling, and 5 to 8 inches for spring use, respectively and loaded by spring force, compressed air pistons or hydraulically actuated rams;

4) several of the tool frames carrying a second set of multiple rows of shallow tilling coulters, some always placed behind the deep tilling tines and some optionally placed in front of the deep tilling tines, the shallow tilling coulters being present in greater number than the deep tilling tines and being spaced apart with no specific special relationship to the deep tilling tines;

5) the shallow tilling coulters disturbing the soil for a depth of about 1 to 4 inches clearing plant debris between deep tilled grooves;

6) a last set of ruffled disk shallow coulters provided to mix and incorporate plant debris into the soil;

6) the tool bar optionally having a tool frame that carries a set of harrow tools, cage roller tools or packer wheels for smoothening the soil surface;

whereby the shallow tilling tines smoothen the tilled soil surface, eliminating the mounds formed on the sides of the deep groove generated by the deep tilling tines, and remove plant debris between the deep tilled grooves, creating a clean tilled field appearance, so that the shallow tilled regions provide sufficient water absorption for rain or irrigation water, substantially eliminating water run-off, as well as soil erosion.

BRIEF DESCRIPTION OF THE DRAWING

The invention will be more fully understood and further advantages will become apparent when reference is had to the following detailed description of the preferred embodiments of the invention and the accompanying drawing, in which.

DETAILED DESCRIPTION OF THE INVENTION

Figure 1:
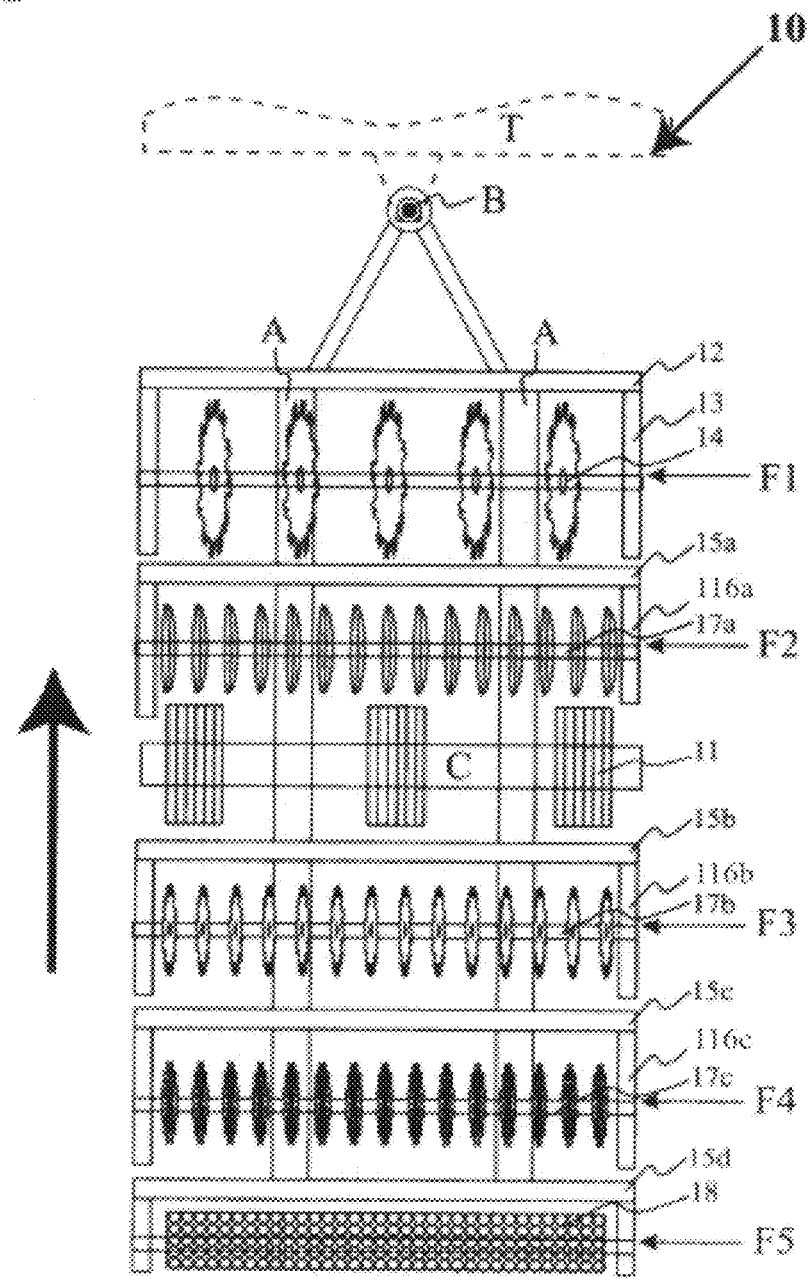
FIG. 1 is a plan view schematically illustrating a tilling unit having a front set of support wheels with a plurality of sets of shallow tilling coulters placed behind a first set of deep tilling tines.

This invention relates to a tilling system. The tilling system comprises a tool bar that carries a plurality of tool frames, each being adjustable in spacing and adapted to be lowered or raised above the ground. Each of the tool frames carries a deep tilling tine and a plurality of sets of shallow tilling coulters. All of the deep tilling tines and shallow tilling coulters run at the ground speed of the tillage system selected by the tillage system operator. The depth to which the deep tilling tines penetrate the ground is selected by the operator by adjusting a spring loaded, compressed air piston loading or hydraulically actuated ram loading of the individual tool frames typically in the range of 5 to 12 inches for fall or primary tilling and typically in the range of 5 to 8 inches for spring or finish tilling. The deep tillage tine wheels have protrusions in the form of teeth with replaceable inserts made from hardened steel and cut through the soil forming deep grooves. This groove forming action displaces soil in the form of two mounds that pile up on either side of the deep groove. This deep tilling action is selected to be nominally located at a planting location that is designed for planting seeds in rows. Deep tilling is generally carried out during spring planting time. It can also be carried out during the fall planting time to clear the plane debris at the end of harvest season. Such deep tilling loosens the soil, promoting seed growth. Each of the deep grooves formed by the deep tilling operation has only a small volume. Substantial quantities of rainwater or irrigation water tend to run-off before any absorption in the field occurs. This results in widening of the deep grooves, producing erosion and further increasing chances for run-off. Moreover, the mound formed around the deep grooves, containing premium topsoil, often times washes off from the field, creating topsoil loss.

The tillage system uses a second set of shallow tilling coulters which are greater in number than twice the number of deep tilling tines and are mounted on the tool bar separately as a gang of shallow tilling coulters. The number of shallow tilling coulters can vary in accordance with the spaces between the deep tilling tines. Typically, the ratio of the number of shallow tilling coulters to that of the deep tilling tines ranges from 2.1 to 4. The set of shallow tilling coulters may be lowered or raised to select a desired tilling depth, typically in the range of 1 to 4 inches. The passage of the shallow tilling coulter tines directly behind the deep tilling tines smoothens all the mounds created on the sides of the deep groove formed by the deep tilling tines. In addition, the shallow tilling coulter tines clean up the area between the deep tilled grooves, eliminating any weed residue including perennial weeds and creating a clean tilled field appearance. When rainwater or irrigation water falls on the field, the tilled portions between the deep grooves have significantly increased water absorption volume. This enables the rainwater or irrigation water to be absorbed within the field. The water run-off and soil erosion are significantly reduced or substantially eliminated, thereby preventing waterways pollution or contamination.

The deep tilling tine wheels may be lowered into the soil to a typical depth of about 5 to 12 inches for fall or primary tilling and 5 to 8 inches for spring or finish tilling. The soil is deep tilled by these deep tilling tine wheels, which loosen the soil for enhanced plant growth. Deep tilling creates a groove with mounds on either side thereof. The small volume of the deep groves in the field is insufficient to prevent water run-off during a rainstorm or water irrigation. This problem is ameliorated by a second set of shallow tilling coulter tines, which follow the deep tilling tines to quickly smoothen the mounds and thereby create a field that is substantially smooth. The shallow tilling coulters also clear plant debris between the deep grooves in the field, creating a pleasant tilled field appearance that is free from rows of weed patches.

FIG. 1 illustrates generally at 10 a plan view of a typical tillage system according to the present invention. The tillage system comprises a tillage unit and a tractor hitched to it. The tractor truck moves in the direction of the arrow. The tillage unit has a common tool bar A, which carries a plurality of tool frames F1, F2, F3, F4 and F5. The tillage unit is attached to a tractor T using the hitch B and is carried by a set of front support wheels 11 with a shaft C. The common tool bar A connects to a first tool bar segment 12. A depth of penetration adjustment means, element 13, is connected to first tool bar segment 12 and this adjustment means is selected from the group consisting of a spring force, compressed air pistons or hydraulically actuated rams. The element 13 controls the depth of penetration of the plurality of deep tilling tines .14 of the first tool frame F1 to raise or lower the deep tilling tines as a group. The penetration depth of the deep tilling tines typically ranges from about 5 to 12 inches for fall or primary tilling and 5 to 8 inches for spring or finish tiling. The operator of the tillage system also controls the rotational speed of these deep tilling wheels by the speed of movement of the tillage system. The common tool bar A connects to a second tool bar segment 15a. A depth of penetration adjustment means, element 116a, is connected to second tool bar segment 15a and this adjustment means is selected from the group consisting of a spring force, compressed air pistons or hydraulically actuated rams. The element 116a controls the depth of penetration of the plurality of shallow tilling curved coulters 17a of the second tool frame F2 to raise or lower the shallow tilling curved coulters as a group. The shallow tilling curved coulters penetrate the ground as a group from 1 to 4 inches and push the tilled soil laterally. In fields that do not require this function, the curved coulters may be raised above the ground. The operator selects the rotational speed of these shallow tilling curved coulters by the translational speed of the tilling system. The common mtool bar A connects to a third tool bar segment 15b. A depth of penetration adjustment means, element 116b, is connected to third tool bar segment 15b and this adjustment means is selected from the group consisting of a spring force, compressed air pistons or hydraulically actuated rams. The element 116b controls the depth of penetration of the plurality of shallow tilling toothed coulters 17b of the third tool frame F3 to raise or lower the shallow tilling toothed coulters as a group. The tool frame F3 of shallow tilling toothed coulters or waffle coulters 17b extends behind the shallow tilling curved coulters 17a. The element 116b controls the depth of penetration of the plurality of shallow tilling toothed coulters 17b of the third tool frame F3 to raise or lower the shallow tilling toothed coulters as a group to penetrate the ground from 1 to 4 inches. The orientation of the shallow tilling toothed coulters may be selected from 0 degrees (along the translation direction of the tillage system) or 10 degrees with respect to this translation direction. When the shallow tilling toothed coulter is inclined, it pushes the tilled soil laterally in a direction perpendicular to the tilling system translation direction in a manner similar to the shallow tilling curved coulters. The operator selects the rotational speed of these shallow tilling toothed coulters by the translational speed of the tilling system. The common tool bar A connects to a fourth tool bar segment 15c. A depth of penetration adjustment means, element 116c, is connected to fourth tool bar segment 15c and this adjustment means is selected from the group consisting of a spring force, compressed air pistons or hydraulically actuated rams. The element 116c controls the depth of penetration of the plurality of shallow tilling ruffled coulters 17c of the fourth tool frame F4 to raise or lower the shallow tilling ruffled coulters as a group. The tool frame F4 of shallow tilling ruffled coulters 17c extends behind the shallow tilling toothed coulters 17b. The element 116c controls the depth of penetration of the plurality of shallow tilling toothed coulters 17c of the fourth tool frame F4 to raise or lower the shallow tilling ruffled coulters as a group to penetrate the ground from 1 to 4 inches. The shallow tilling ruffled coulters mix and incorporate plant debris within the tilled soil, reducing soil erosion by rain water or irrigation water. This set of ruffled shallow tilling coulters is always provided to mix the plant debris intimately within the tilled soil. The operator selects the rotational speed of these shallow tilling toothed coulters by the translational speed of the tilling system. The shallow tilling curved coulters, inclined toothed coulters as well as the ruffled coulters displace and smoothen mounds formed around deep tilled grooves, leaving behind a smooth tilled field. The tilling load for the deep tilling tines and the shallow tilling coulters is applied by conventional means, such as spring force, compressed air pistons or hydraulically actuated rams. The elements 13, 116a, 116b arid 116c contain a spring loading device, compressed air pistons and hydraulic cylinders providing height adjustment of deep tilling tines and coulters. The tillage system tool bar A may carry an optional segment 15d that carries tool frame F5 that carries tillage tools such as harrow tools, cage rollers or packer wheels. FIG. 1 shows a cage roller 18 attached at the very end of the tillage system smoothening the tilled field.

Figure 2:
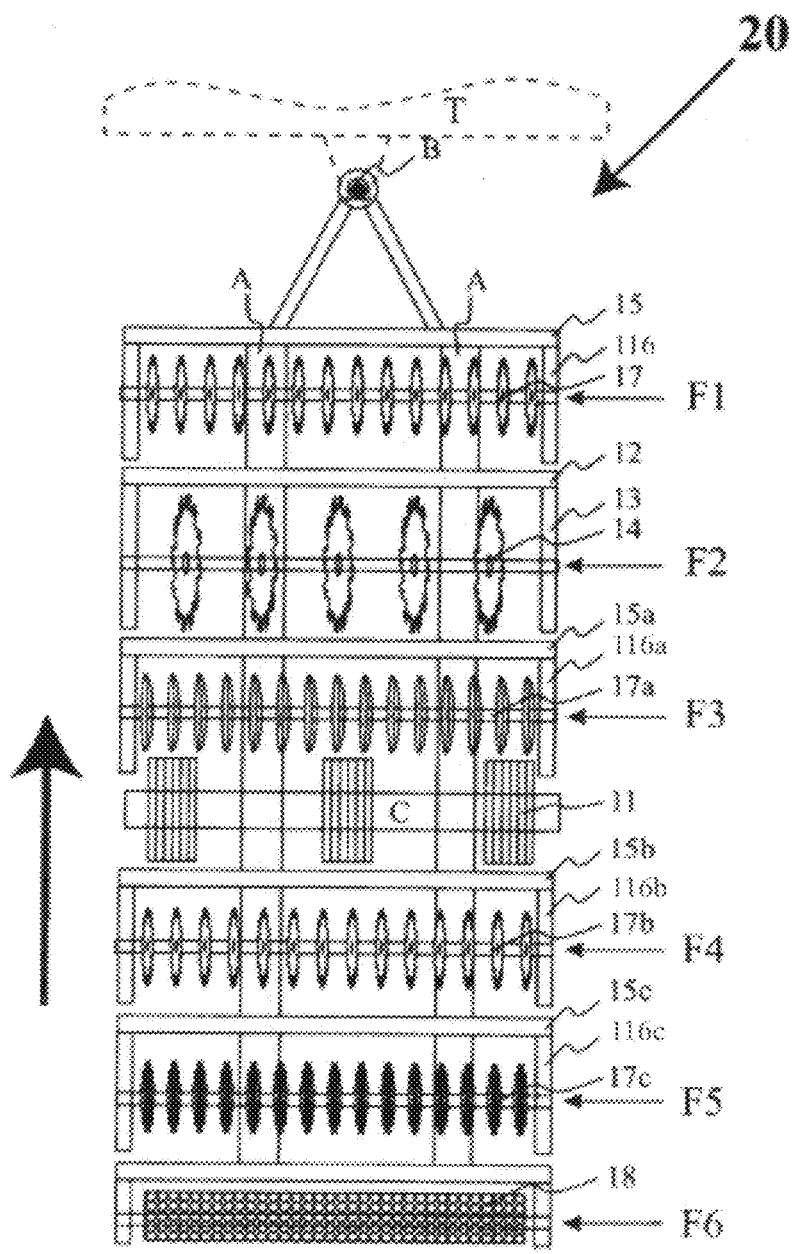
FIG. 2 is a plan view schematically illustrating a tilling unit having a front set of support wheels with a plurality of sets of shallow tilling coulters with one set placed in front and several sets placed behind a set of deep tilling tines.

FIG. 2 is similar to FIG. 1 in every aspect except a row of shallow tilling toothed coulters of frame F1 is provided before the deep tilling tines of frame F2. The common tool bar A connects to the first tool bar segment 15 that carries the first frame F1 that has shallow tilling toothed coulters or ruffled coulters 17 to cut and size large length plant stock such as corn or other tall plants enabling easy tilling with deep tilling tines 14 in frame F2. A depth of penetration adjustment means, element 116, is connected to first tool bar segment 15 and this adjustment means is selected from the group consisting of a spring force, compressed air pistons or hydraulically actuated rams. The element 116 controls the depth of penetration of the plurality of shallow tilling toothed coulters 17 of the first tool frame F1 to raise or lower the shallow tilling toothed coulters as a group. The frame F1 may be raised or lowered by the operator of the tillage system using penetration adjustment means, element 116. Clearly more than one shallow tilling toothed coulter may be inserted in any location within the rows of shallow tillers. The last row F7 of shallow tilling coulter is always a ruffled shallow coulter to enable mixing and incorporation of plant debris into the tilled soil. FIG. 2 shows a cage roller 18 attached at the very end of the tillage system smoothening the tilled field.

Figure 3:
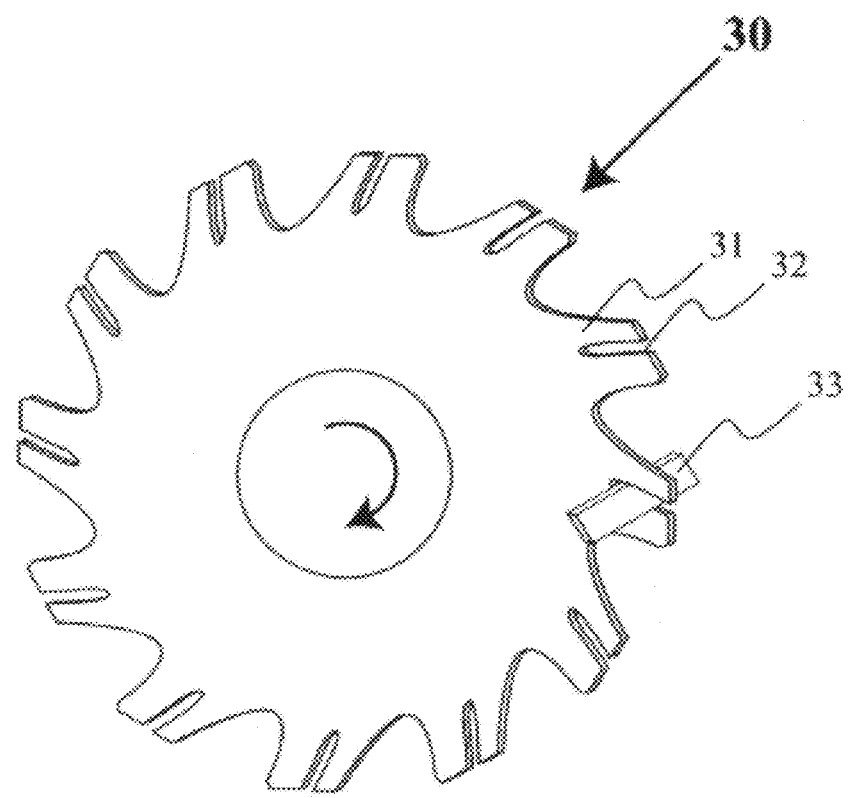
FIG. 3 illustrates the constructional details of the deep tilling tines.

FIG. 3 illustrates at 30 the details of the first set of deep tilling tines. The deep tilling tines have a plurality of teeth with channels 31 that dig deep into the soil. The channels carry an inserted hard steel bit 32 that is positioned and anchored within the channel 31. Only one of the inserted hard steel bits 32 is shown for clarity. The inserted bits 32 protrude from the surface of the deep tilling tines, widening the groove formed within the soil and displacing the soil to the surface of the field being tilled. The inserted bits may be replaceable and held in place by a number of means, including bolting, tapered fit and other suitable means. The inserts may be also permanently attached. While this form of deep tilling tine is a preferred embodiment other commercial coulters with a diameter capable of deep tilling to a depth of 5 to 12 inches may be also used.

Figure 4:
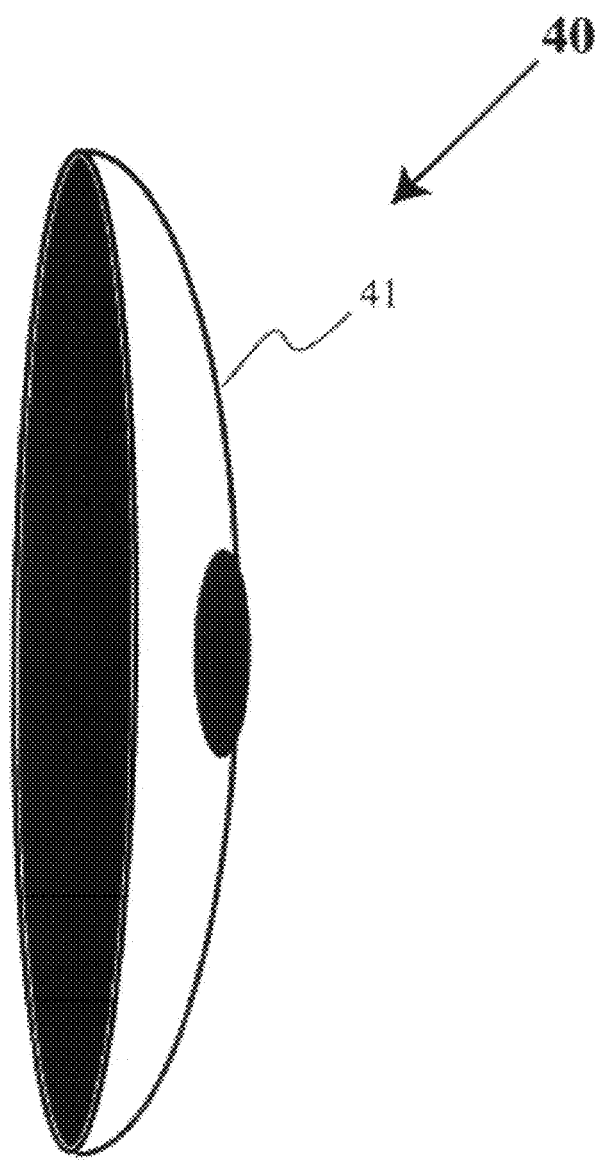
FIG. 4 illustrates the constructional details of a curved shallow tilling coulter that forms a second row in FIGS. 1 and 2.

FIG. 4 illustrates at 40 the details of the curved coulter which displaces soil laterally as the coulters till the ground. The curved coulter is shown at 41 with a convex curvature. The central aperture is used to attach a plurality of curved coulters on a shaft or separately mounted at selected distances.

Figure 5:
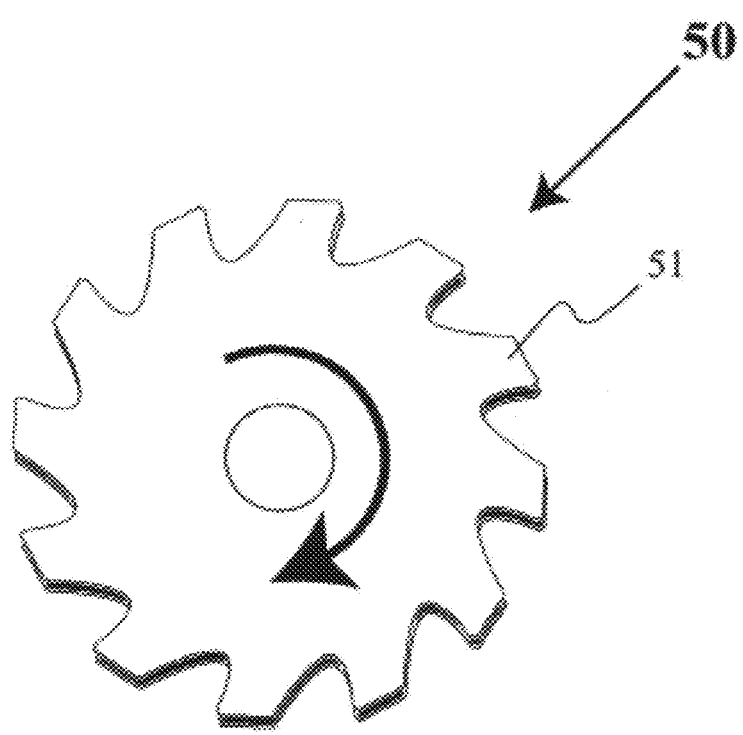
FIG. 5 illustrates the constructional details of a toothed shallow tilling coulter.

FIG. 5 illustrates the details of a shallow tilling toothed coulter or ruffled coulter. The toothed coulter or ruffled coulter is typically smaller in diameter than the deep tilling tines and have sharp teeth 51. The shallow tilling coulters may be mounted at an angle typically in the range of 0 to 10 degrees with respect to the direction of movement of the tillage system, and thus move the soil laterally. A mound created by the first set of deep tilling tines will be smoothened by the second set of shallow tilling coulters as they pass through the field being tilled. While this shallow tilling toothed coulter is a preferred embodiment, alternate coulters that shallow till in the range of 1 to 4 inch may be also used.

Figure 6:
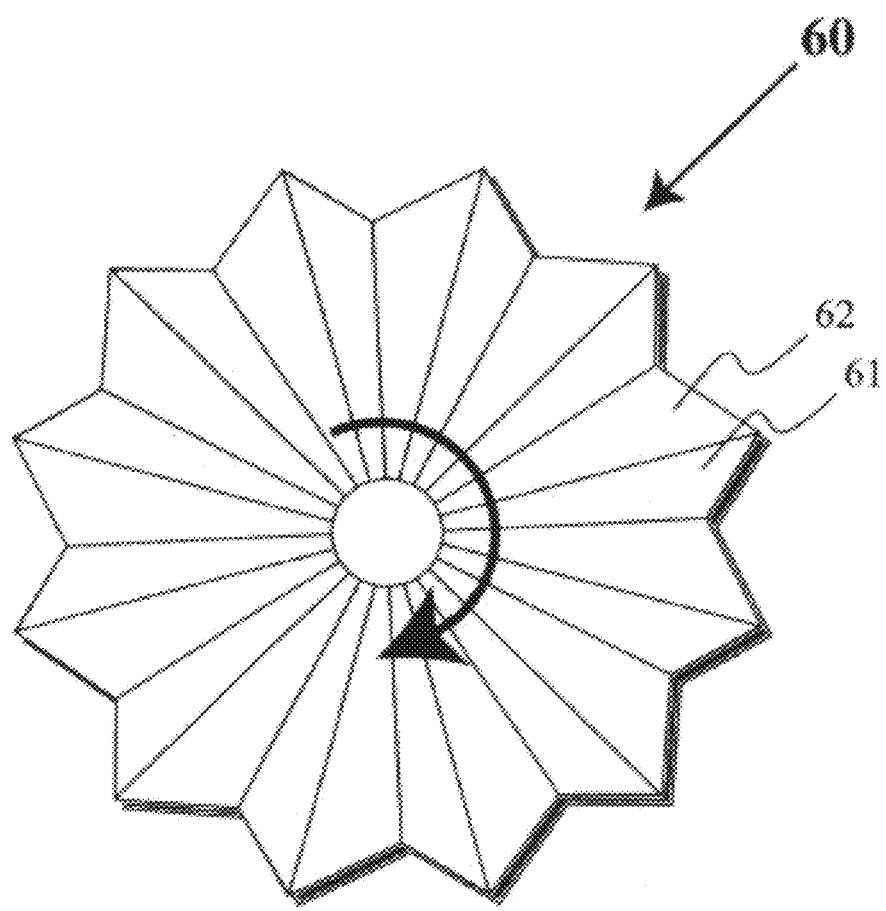
FIG. 6 illustrates the constructional details of a last row shallow tilling coulter having a ruffled disk configuration.

FIG. 6 illustrates at 60 the details of the shallow tilling ruffled coulter. The ruffled coulters are typically smaller in diameter than the deep tilling tines and have sharp teeth. The body of the shallow tilling coulter tines is not flat, but is a series of ruffled folds (as shown) and tends to move the soil backwards and forwards, propelling the soil sideways. The adjacent ruffles are shown at 61 and 62. A mound created by the first set of deep tilling tines will be smoothened by the shallow tilling ruffled coulters as they pass through the field being tilled. The shallow tilling ruffled coulters mix and incorporate plant debris into the tilled soil promoting water and soil conservation. A wave coulter functions similar to the ruffled coulter and may also be used.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A tillage system comprising:
   a) a tilling unit having a pair of supporting front wheels towed by a tractor drive;
   b) said tilling unit having a common tool bar carried by said pair of front wheels with three or more tool bar segments for attaching tool frames, the tool bar segments being positioned one behind the other in the direction of movement of said tilling unit;
   c) said common tool bar having attached thereto a first tool bar segment carrying a first tool frame attached to a first set of a plurality of deep tilling tines producing deep grooves in a tilled field, and being provided with means for adjusting spacing between the tines, means for adjusting the deep tilling tines up and down as a group being loaded by spring force, compressed air pistons or hydraulically actuated rams, and deep tilling tines rotate at a rotational speed matching the ground speed of said tillage system;
   d) said common tool bar having attached thereto a second tool bar segment carrying a second tool frame attached to a plurality of rows carrying sets of shallow tilling curved coulters) the total number of coulters carried by the sets being more than twice the number of deep tilling tines and being provided with additional means for adjusting said coulters up and down as a group being loaded by spring force, compressed air pistons or hydraulically actuated rams, and shallow tilling coulters rotating at a rotational speed matching the ground speed of said tillage system;
   e) said second set of shallow tilling coulters being adjustable in orientation with respect to the direction of movement of said tiller;
   f) said first set of plurality of deep tilling tines comprises inserted hardened steel elements that extend from the surface; and
   g) said shallow tilling curved coulters on the second tool bar segment displace soil laterally during tilling;
   h) the common tool bar having a third tool bar segment directly behind the second tool bar segment that carries a row of shallow tilling toothed coulters; and
   i) a shallow tilling toothed coulter or waffle coulter being provided in front of deep tilling tines in order to size large length tall plant debris prior to deep tilling;
      whereby the shallow tilling coulters smoothen the tilled soil surface, eliminating mounds formed on the sides of the deep groove generated by the deep tilling tines, and removing plant debris between the deep tilled grooves, creating a clean tilled field appearance, so that shallow tilled regions provide sufficient water absorption for rain Of irrigation water, substantially eliminating water run-off, as well as soil erosion.

2. The tillage system as recited by claim 1, wherein said first set of plurality of deep tilling tines till to a depth of about 5 to 12 inches creating deep tilled grooves in the field according to the spacing of the deep till tines.

3. The tillage system as recited by claim 1, wherein said second set of shallow tilling curved coulters till to a depth of about 1 to 4 inches, smoothening mounds left by the deep tilling tines and clearing plant debris between said grooves, creating a clean-tilled field.

4. The tillage system as recited by claim 1, wherein said number of shallow tilling curved coulters as compared to the number of the deep tilling tines is within a range of 2.1 to 4.

5. The tillage system as recited by claim 4, wherein the shallow tilling curved coulters may be lifted above ground when not needed.

6. The tillage system as recited by claim 1, wherein the shallow tilling toothed coulters may be inclined at an angular range of 0 to 10 degrees with respect to the translational direction of the tillage system thereby displacing soil laterally during tilling.

7. The tillage system as recited by claim 1, wherein the common tool bar has a fourth tool bar segment directly behind the third tool bar segment that carries a row of shallow tilling ruffled coulters.

8. The tillage system as recited by claim 7, wherein the common tool bar has a fifth tool bar segment directly behind the fourth tool bar segment that carries harrow tool or cage roller tool to smoothen the ground.

9. The tillage system as recited by claim 7, wherein the common tool bar has a fifth tool bar segment directly behind the fourth tool bar that carries harrow tool, cage roller tool or packer wheels to smoothen the ground.

10. A tillage system comprising:
    a) a tilling unit towed by a tractor drive;
    b) said tilling unit having a pair of front wheels and a pair of back wheels;
    c) said tilling unit having a common tool bar carried by said pair affront wheels and pair of back wheels with three or more tool bar segments for attaching tool frames, said tool bar segments being positioned one behind the other in the direction of movement of said tilling unit;

d) a first tool bar segment carrying a first tool frame attached to a first set of a plurality of deep tilling tines producing deep grooves in a tilled field, and being provided with means for adjusting spacing between the tines, means for adjusting the deep tilling tines up and down as a group being loaded by spring force, compressed air pistons or hydraulically actuated rams, said deep tilling tines rotating at a rotational speed substantially matching the ground speed of said tillage system;

e) a second tool bar segment carrying a second tool frame attached to a plurality of rows carrying sets of shallow tilling coulters, the total number of coulters carried by the sets being more than twice the number of deep tilling tines and being provided with additional-means for adjusting said coulters up and down as a group being loaded by spring force, compressed air pistons or hydraulically actuated rams of penetration adjustment mean, and shallow tilling coulters rotating at a rotational speed matching the ground speed of said tillage system;

f) said second set of shallow tilling coulters being adjustable in orientation with respect to the direction of movement of said tiller;

g) said first set of plurality of deep tilling tines comprises inserted hardened steel elements that extend from the surface;

h) said shallow tilling curved coulters on the second tool bar segment displace soil laterally during tilling;

i) the common tool bar having a third tool bar segment directly behind the second tool bar segment that carries a row of shallow tilling toothed coulters; and j) a shallow tilling toothed coulter or waffle coulter being provided in front of deep tilling tines in order to size large length tall plant debris prior to deep tilling;

whereby the shallow tilling coulters smoothen the tilled soil surface, eliminating mounds formed on the sides of the deep groove generated by the deep tilling tines, and removing plant debris between the deep tilled grooves, creating a clean tilled field appearance, so that shallow tilled. Regions provide sufficient water absorption for rain or irrigation water, substantially eliminating water runoff, as well as soil erosion.

11. The tillage system as recited by claim 10, wherein said number of shallow tilling coulters as compared to the number of the deep tilling tines is within a range of 2.1 to 4.

12. The tillage system as recited by claim 10, wherein the common tool bar has a fourth tool bar segment directly behind the third tool bar segment that carries a row of shallow tilling ruffled coulters.

13. The tillage system as recited by claim 12, wherein the common tool bar has a fifth tool bar segment directly behind the fourth tool bar segment that carries harrow tool, cage roller tool or packer wheels to smoothen the ground.

* * * * *